United States Patent
Ji (10) Patent No.: US 8,145,826 B2
(45) Date of Patent: Mar. 27, 2012

(54) METHOD AND SYSTEM FOR PROVIDING DATA ACCESSIBILITY AND INTERLINKS BETWEEN A USER AND A STORAGE DEVICE

(75) Inventor: Yongguang Ji, Shenzhen (CN)

(73) Assignee: UITSTOR (USA) Inc., Santa Clara, CA (US)

( * ) Notice: Subject to any disclaimer, the term of this patent is extended or adjusted under 35 U.S.C. 154(b) by 306 days.

(21) Appl. No.: 12/419,981

(22) Filed: Apr. 7, 2009

(65) Prior Publication Data

US 2010/0064112 A1 Mar. 11, 2010

(30) Foreign Application Priority Data

Sep. 9, 2008 (CN) .......................... 2008 1 0215564

(51) Int. Cl.
*G06F 13/00* (2006.01)
(52) U.S. Cl. ........ 711/100; 711/147; 711/161; 711/162; 711/163; 711/164; 711/165; 711/170; 711/171; 711/172; 711/173
(58) Field of Classification Search .................. 711/100, 711/147, 161, 162, 163, 164, 165, 170, 171, 711/172, 173
See application file for complete search history.

(56) References Cited

U.S. PATENT DOCUMENTS

| | | | | |
|---|---|---|---|---|
| 7,028,158 | B1 * | 4/2006 | Beatty et al. ................... | 711/165 |
| 7,043,618 | B2 * | 5/2006 | Barlow et al. .................. | 711/170 |
| 7,062,605 | B2 * | 6/2006 | Chatterjee et al. ............. | 711/170 |
| 7,818,701 | B1 * | 10/2010 | Kolokowsky .................. | 711/173 |
| 7,913,051 | B1 * | 3/2011 | Todd et al. ..................... | 711/165 |
| 8,001,352 | B1 * | 8/2011 | Chatterjee et al. ............. | 711/165 |

* cited by examiner

*Primary Examiner* — Trong Phan
(74) *Attorney, Agent, or Firm* — Ladas & Parry LLP (57) ABSTRACT

A new approach to the manipulation of data access of storage that complies with certain mapping interlinks between front-end servers and back-end storage data pool and which lessens the complexity of the interlinks and improves the efficiency of the data accessibility is disclosed. The method allocates multiple user hardware devices and the logical units to a correspondent designated sub-zone so that there is at least one sub-zone associated with two or more logical units, wherein the logical units reside inside the storage hardware or network. The method establishes the data access interlinks within the same sub-zone between users and logical units. A system that substantiates the method is also disclosed. The method and the system together comprise a new storage scheme.

18 Claims, 10 Drawing Sheets

METHOD AND SYSTEM FOR PROVIDING DATA ACCESSIBILITY AND INTERLINKS BETWEEN A USER AND A STORAGE DEVICE

CLAIM OF PRIORITY

The present applications claims priority pursuant to 35 U.S.C. §119 to patent application number 200810215564.1 filed on Sep. 9, 2008 in the People's Republic of China and is incorporated by reference herein in its entirety.

BACKGROUND OF THE INVENTION

The present invention relates generally to computers and communications and more particularly to a software method and system providing data interlinks between front end users and back end storage pools.

It is quite common that hardware of various models from different vendors and manufactures are present in the same storage network due to the diversified storage market and technology. This heterogeneousness makes the administration and management of the storage network very complex. Access conflicts and resource competition among the front-end users is thus becoming inevitable.

Figure 1:
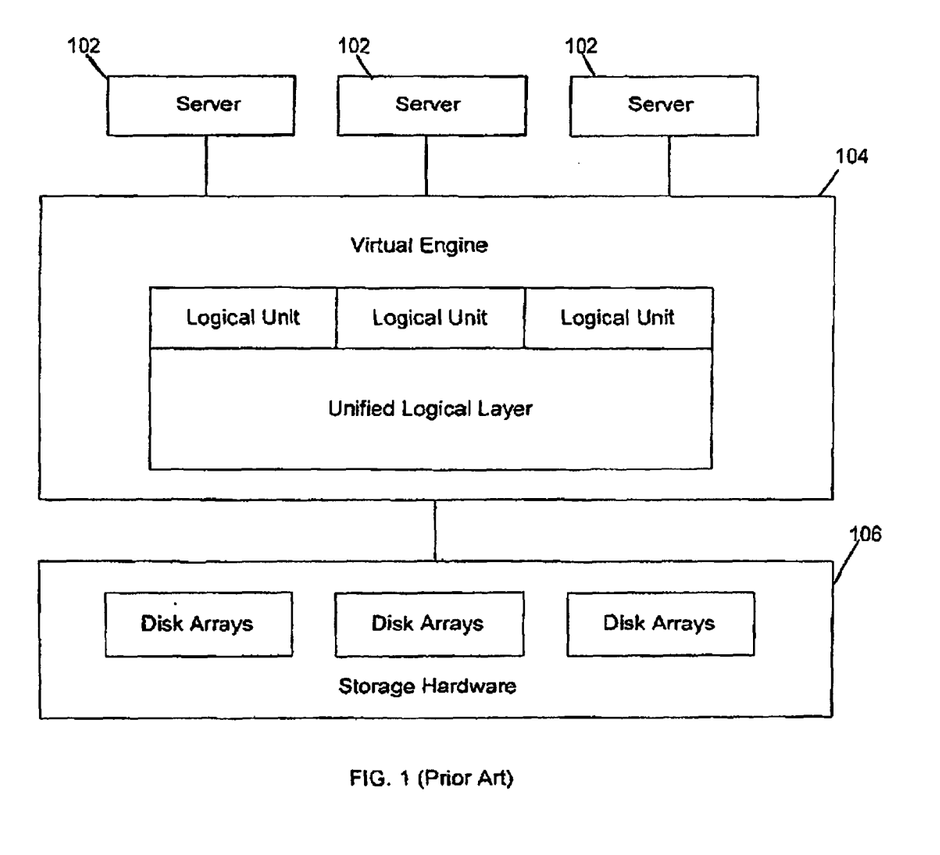
FIG. 1 is a schematic representation of a prior art system.

To solve these problems, the prior art provides generally a virtualization technique and introduces a virtual engine at the storage end to manage all front-end users. With reference to FIG. 1, the front end users are connected to the virtual engine through servers 102 and the virtual engine 104 manages the disk arrays inside the storage hardware 106. The virtual engine comprises logical units and a unified virtual layer. The unified virtual layer is the abstraction of the disk arrays, which reflects the access requests from front end users to the disk arrays; the logical units face toward the front-end users and examine the "legitimacy" of the access request from the front-end users. The logical units share such access requests so that the goal of reducing access conflicts and resource competition can be accomplished.

A storage pool or hardware device is thus abstracted into multiple logical units. One storage hardware device can link to several front-end users, while one front-end user may access multiple storage hardware devices. Such inter-access or interlinks between the storage hardware devices and front-end users will become more and more complex as the number of storage hardware devices and front-end users becomes bigger and bigger. The system administrator has to maintain, manually, each interlink between the back-end storage and the front-end user or server. The burden will eventually become too heavy to bear and human error or mistake will unfortunately become inevitable.

SUMMARY OF THE INVENTION

In accordance with one aspect of the invention, a method of manipulating the data access to storage that complies with certain mapping interlinks between front-end users or servers and back-end storage data pool is provided. The method lessens the complexity of the interlinks and improves the efficiency of the data accessibility. The method allocates multiple user servers to correspondent designated sub-zones, allocates multiple logical units to the correspondent designated sub-zones so that there is at least one sub-zone that is associated with, equal to or more than, two logical units; in which the logical units reside inside the storage hardware; and establishes the data access interlinks between users and logical units in the same sub-zone.

In accordance with another aspect of the invention, a method of accessing the logical units of the storage hardware and storage network includes inquiring and checking the existence among the sub-zones of identifiers (IDs) of the user hardware devices when access is requested by the user hardware devices, when the ID is found in a certain sub-zone, retrieving the ID of an associated logical units from the Request to Access, and if the ID of the associated logical unit is found, granting the Request to Access and allowing the data access to proceed, else, denying the Request to Access.

In accordance with another aspect of the invention, a system that manipulates the data access interlinks includes a zoning module to establish multiple sub-zones, a sub-zoning module to allocate multiple user hardware devices to the sub-zones allocated and to allocate multiple logical units to each sub-zone in such manner that each sub-zone will host or accommodate at least two logical units wherein the logical units reside inside the storage hardware and network, and an interlinks module to establish the accessibility interlinks between the user servers and the logical units belonging to the same sub-zone.

In accordance with another aspect of the invention, a system that controls the logical units of the storage hardware and network includes a user interface module to receive the request for access from user hardware devices, an inquiring module to inquire as to the presence or existence of the correspondent user ID when requested by the user hardware devices and to retrieve the logical unit ID from the Request to Access by the users in the same sub-zones if the user ID is found in that sub-zone and a control module to grant the accessibility to the users if the correspondent logical unit ID is found to exist, or to deny the access otherwise.

In accordance with another aspect of the invention, a storage system includes the storage hardware and network with associated logical units to handle the request to access, the user hardware devices to initiate the request to access, and the framework of sub-zoning that determines the existence of user IDs among the sub-zones and retrieves the logical units' ID that is allocated or associated with the user ID in the same sub-zone when the user ID is found valid, and forwards the Request to Access to the correspondent storage hardware and network if the logical units' ID is retrieved successfully and otherwise denies the Request to Access.

In accordance with another aspect of the invention, multiple user/servers and the correspondent/affiliated logical units are allocated into designated sub-zones and accessibility between the users and the logical units within the same sub-zones is established while the accessibility from the user/servers to the logical units outside the same sub-zone is prohibited.

In accordance with the invention, the complex interlinks between the user and the logical units are narrowed and limited to each sub-zone so that human effort and error are greatly reduced. In addition the users only inquire the logical units within the sub-zone to which the affiliated users/servers are allocated to instead of a "global" inquiring. For better control purposes, the rights of user access to the logical units are permitted only to those that belong to the same sub-zones.

DETAILED DESCRIPTION OF THE INVENTION

The method in accordance with the invention comprises the following steps: allocating multiple user hardware devices and logical units to pre-designated sub-zones, establishing the accessibility policy among the users and logical units so that the implementation of the accessibility among the users and logical units becomes simplified significantly. The user hardware device can access the logical units whose accessibility is designated by the system administrator. The user hardware device in accordance with the invention includes front-end users and servers.

Figure 2:
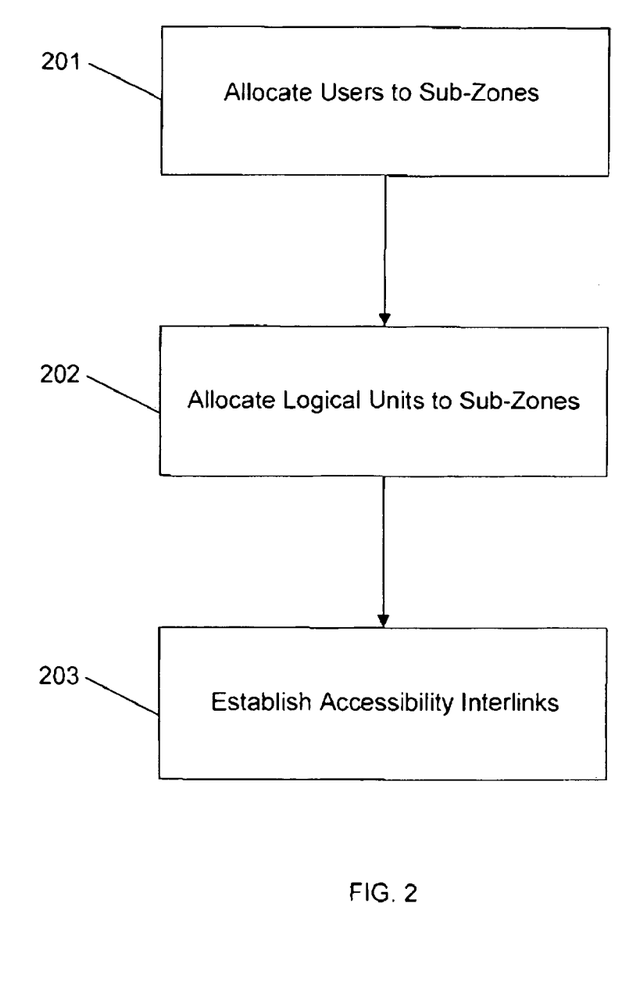
FIG. 2 is a high level flow chart of a method in accordance with the invention.

With reference to FIG. 2, a method in accordance with the invention includes dividing/establishing a plurality of sub-zones. It is a good practice that the number of resulting sub-zones is less than the number of user hardware devices and logical units. In a step 201 multiple users are allocated to the pre-designated/established sub-zones. Multiple users can be allocated to one sub-zone, while an individual user can also be allocated to multiple sub-zones. The user ID and its access authorization will be reserved in the allocated sub-zone. A user will not belong to any sub-zone if it does not have the authorization to access any logical units.

In a step 202 multiple logical units are allocated to the pre-designated/established sub-zones in such way that there is at least one sub-zone that is allocated to at least two logical units. The logical units reside inside the storage hardware/pool. The ID of the logical units is also reserved in the designated sub-zones. If an individual logical unit is inaccessible to any users, the storage hardware becomes its private hardware. This logical unit will not belong to any sub-zone. In a step 203 accessibility interlinks are established between the users and logical units inside each sub-zone.

The order of execution of steps 201 and 202 is not rigorous and they can proceed at the same time. The policies to allocate the users and logical units into sub-zones can be varied: such as randomly or evenly or according to the properties of the applications. These properties include the application classification, throughput/bandwidth, occupied resource, etc.

Figure 3A:
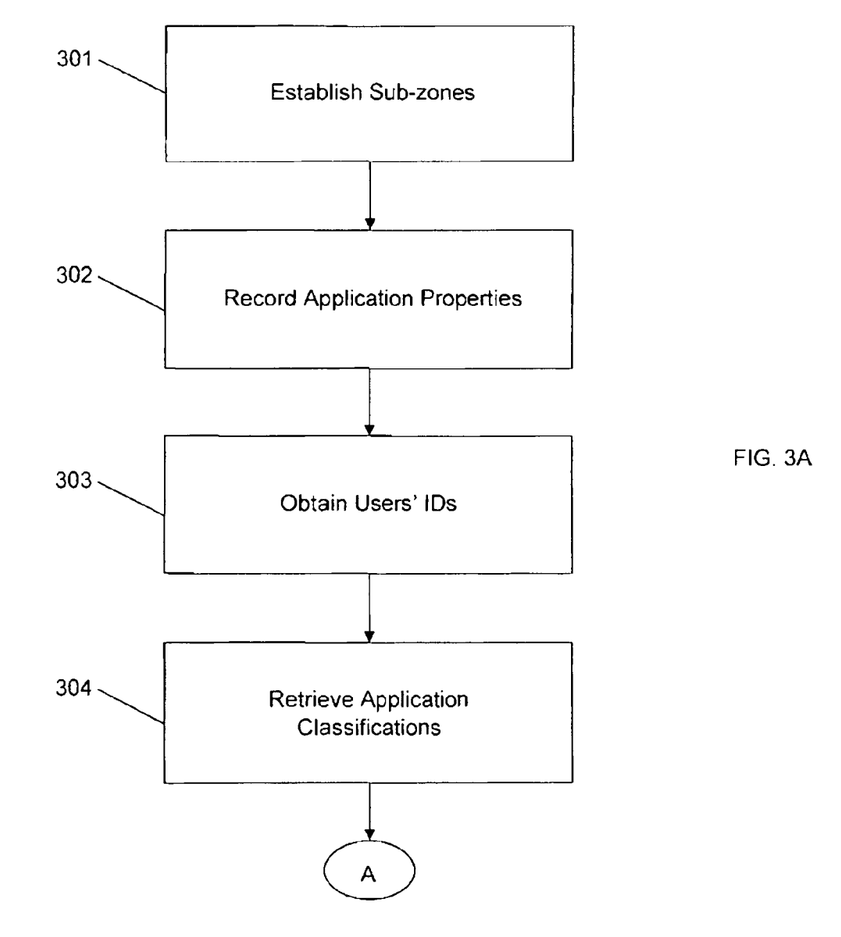
FIGS. 3A and 3B are detailed flow charts of the method of FIG. 2.
Figure 3B:
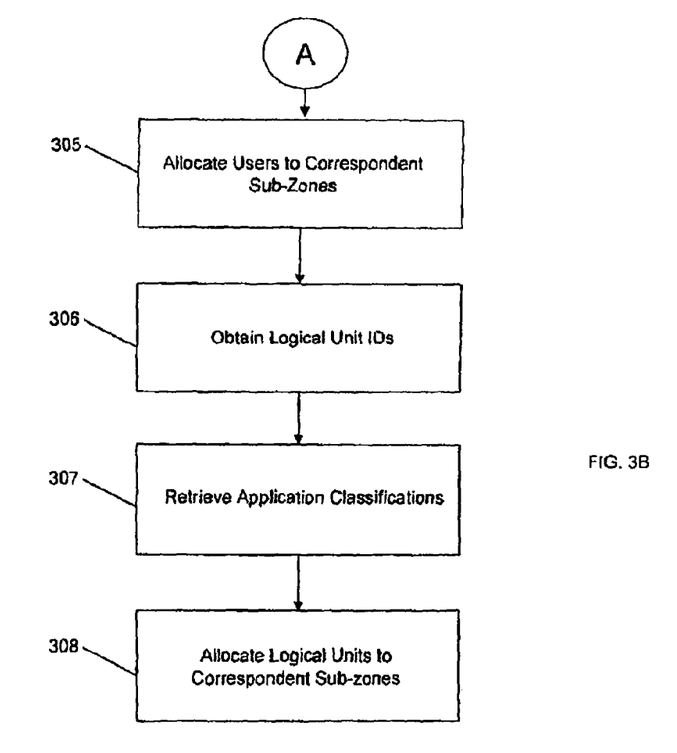

With reference to FIGS. 3A and 3B, there is shown a method in which the policy of allocating users and logical elements is in accordance with the properties of the application. In a step 301, multiple sub-zones are divided/established. In a step 302, correspondent application properties in each sub-zone are recorded and in a step 303, users' IDs are obtained. Application classifications are retrieved from the users' IDs in a step 304 and in a step 305, users with the same application properties are allocated to correspondent sub-zones, recording users' IDs and their authorizations on read and write accessibility. The connection from the step 304 in FIG. 3A to the step 305 in FIG. 3B is identified by a circle A in FIG. 3A.

In a step 306, IDs of the logical units are obtained and in a step 307 corresponding application classifications are retrieved from the IDs of the logical units. Logical units with the same application properties are allocated to correspondent sub-zones and their IDs recorded in a step 308.

In accordance with the invention, the execution order of steps 303-305 and 306-308 is not rigorous.

The method shown in FIGS. 3A and 3B depicts the accessibility interlinks between the users and logical units within each sub-zone. Each user can access the logical units within the same sub-zone. For instance, assume there are sub-zone 1 and 2 and that users 1 and 2 belong to sub-zone 1, and that users 2 and 3 belong to sub-zone 2. Further assume that logical units 1 and 2 belong to sub-zone 1, while logical unit 3 belongs to sub-zone 2. Table 1 illustrates the accessibility interlinks between the users and the logical units:

TABLE 1

|  | User 1 | User 2 | User 3 |
| --- | --- | --- | --- |
| Logical unit 1 | Accessible (read) | Accessible (write) | Inaccessible |
| Logical unit 2 | Accessible (read) | Accessible (write) | Inaccessible |
| Logical unit 3 | Inaccessible | Accessible (read) | Accessible (write) |

In accordance with the invention, in order to add more accessible interlinks between the users and logical units, one can easily do so by adding the user ID into the sub-zone having the correspondent logical units allocated, or by adding the logical units' ID into the sub-zones to which the users are allocated. A tedious manual one-to-one interlinking is thus avoided. The same is true when abolishing the interlinks between the users and logical units. This can be easily accomplished by removing either the user or logical ID from the correspondent sub-zones. Therefore, the effort and complexity of these tasks are greatly diminished.

Figure 4:
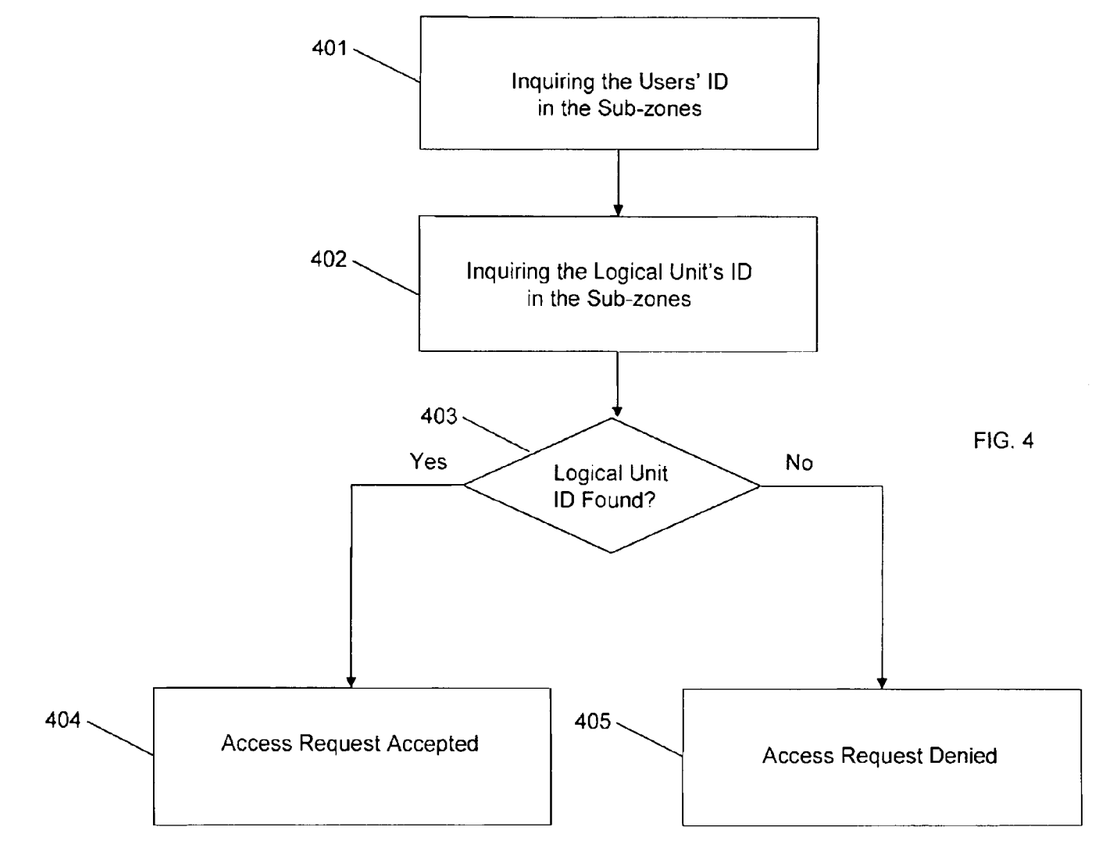
FIG. 4 is a high level flow chart of another method in accordance with the invention.

With reference to FIG. 4, a method of accessing storage includes inquiring the users, ID in the sub-zones following the user hardware device's access request in a step 401. In a step 402, following finding the users' ID, the logical unit's ID from the sub-zone(s) that carries the user ID is inquired. A determination is made in a step 403 whether a logical unit ID is found. If a logical unit ID is found, then in a step 404 the access request is accepted and passed to the logical units concerned. If a logical unit ID is not found, then in a step 405, the access request is denied and the user is notified of the denial.

Figure 5A:
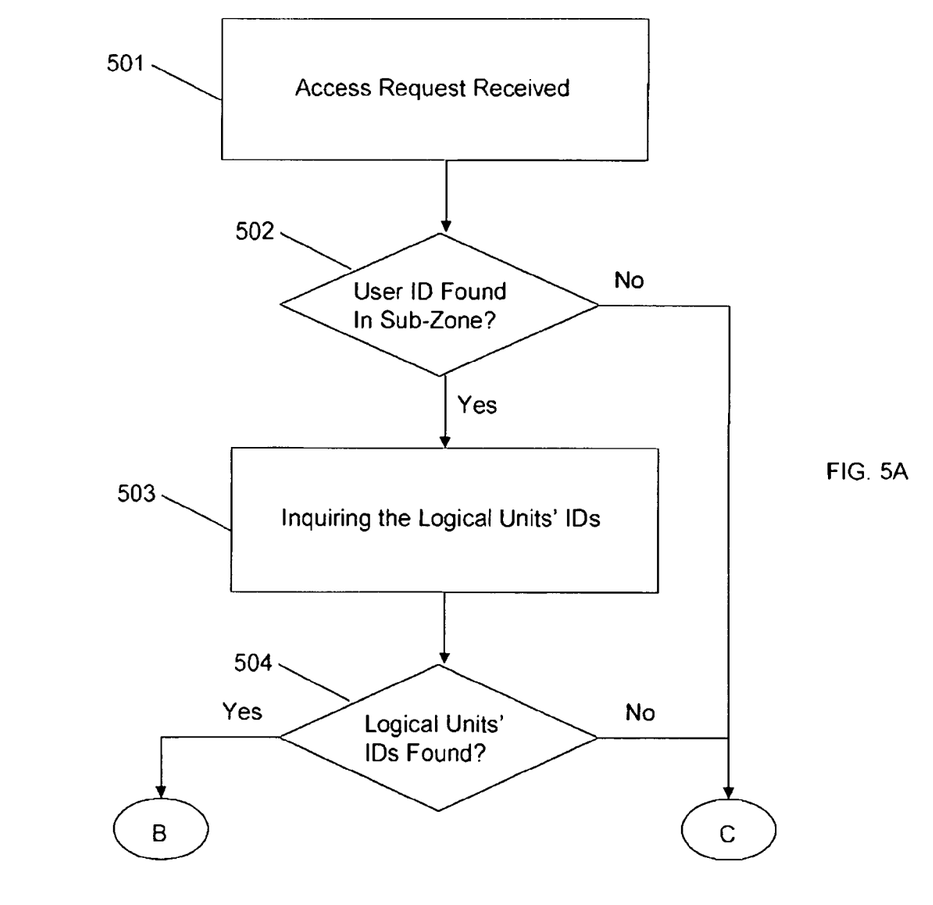
FIGS. 5A and 5B are detailed flow charts of the method of FIG. 4.
Figure 5B:
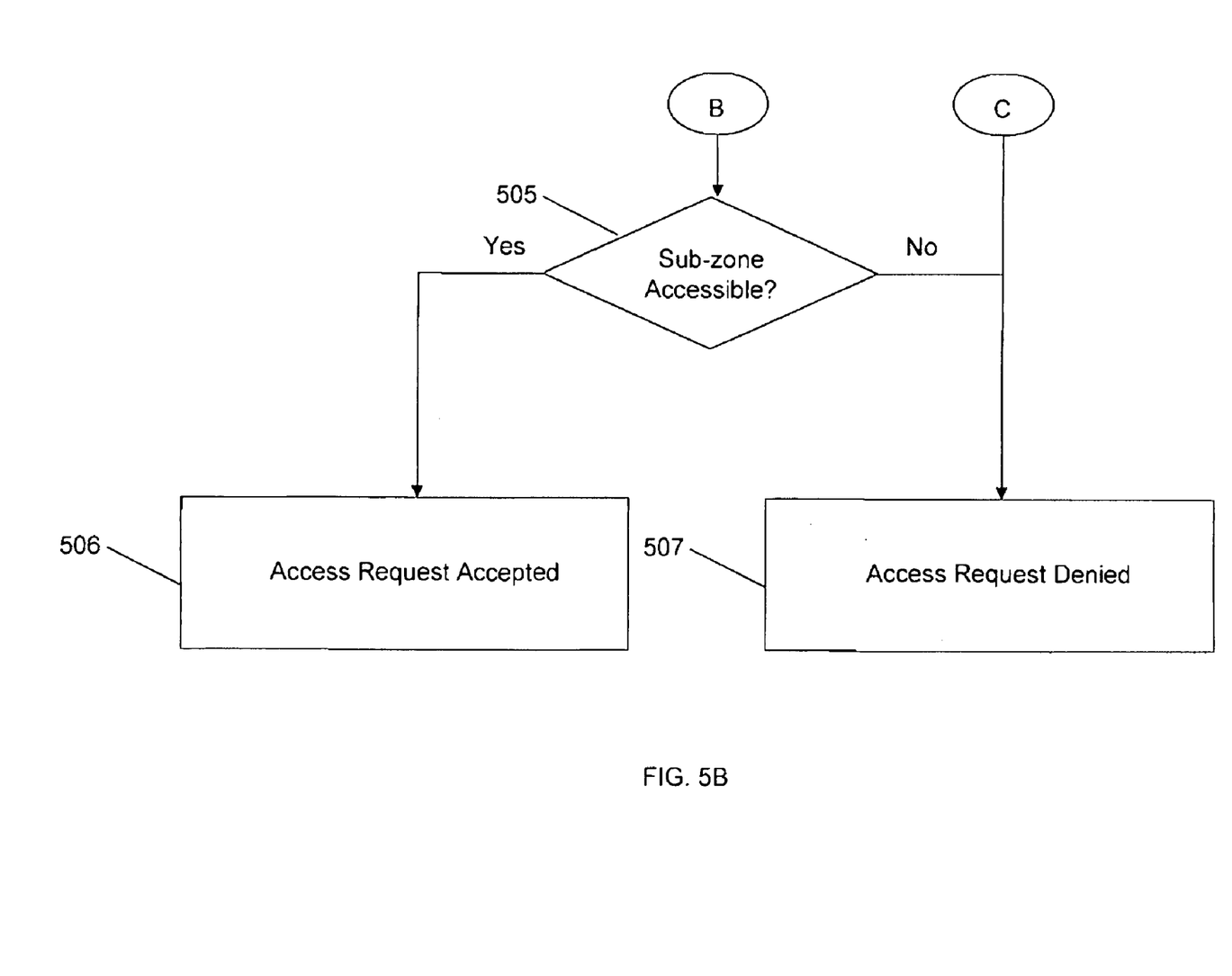

A more rigorous administration is also possible as depicted in FIGS. 5A and 5B. In a step 501 an access request is received from the user and inquiring the user ID in the sub-zones is performed. In a step 502 a determination is made whether the user ID is found in any sub-zone. If the user ID is found, then in a step 503 inquiring the logical units' IDs is performed from the sub-zones that carry the user ID. If the user ID is not found, then in a step 507, the access request is denied and the user notified. In a step 504, a determination is made whether the logical unit's ID is found. If the logical unit's ID is not found, the method proceeds to step 507, otherwise, the method proceeds to a step 505 in which a determination is made whether the user has access to the sub-zone based upon the access request. If the accessibility is validated, then the access request is validated in a step 506, otherwise step 507 is executed and the access request is denied. The connection from the step 504 in FIG. 5A to the step 505 in FIG. 5B is identified by a circle B, and the connection from any of the steps 502 and 504 in FIG. 5A to the step 507 in FIG. 5B is identified by a circle C.

From step 501, the receivers of the access request are the sub-zones, and what each sub-zone needs to do is to check the user and logical unit ID locally; if the ID is not present, the access request will be denied. Therefore, the inquiring process becomes "ID-checking" among the sub-zones. The amount of inquiring, in terms of data and time will be much less than that of prior art schemes. In other words, the administration layer of the sub-zones is now playing the role in receiving the access requests from the users. This layer inquires the user and logical units ID among the sub-zones and denies the request if the IDs are not found. The layer will examine the accessibility of the users as the next step if the ID is found. Both the amount of inquiring and the degree of technical complexity are reduced by the methods of the invention: firstly finding out the sub-zones carrying the user ID, then checking the logical units ID among those sub-zones.

Figure 6:
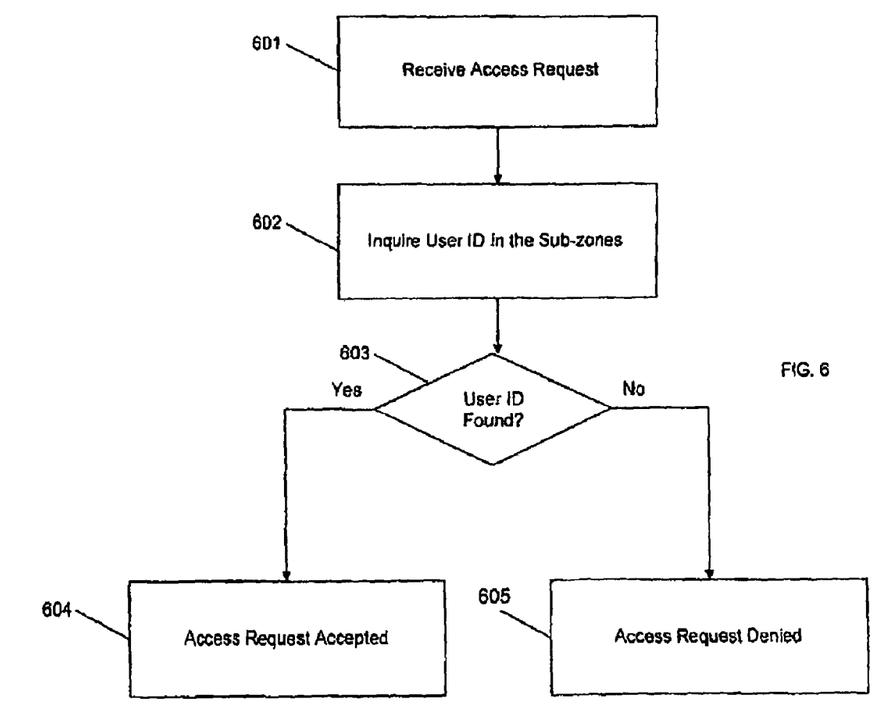
FIG. 6 is a flow chart of yet another method in accordance with the invention.

The logical unit ID that comes with the user's access request can be recorded in the user hardware, or acquired from other hardware devices. Depicted in FIG. 6, a method for a user hardware device to obtain the logical units ID includes a step 601 in which the access request is received from the user. In a step 602, the user ID is inquired in the sub-zones. A determination is made in a step 603 whether the user ID is found. If the user ID is found, then in a step 604, the logical unit ID is fed back to the user from the sub-zones that carry the user ID indicating that the user has accessibility to the logical units. If the user ID is not found, then in a step 605, the access request is denied.

Figure 7:
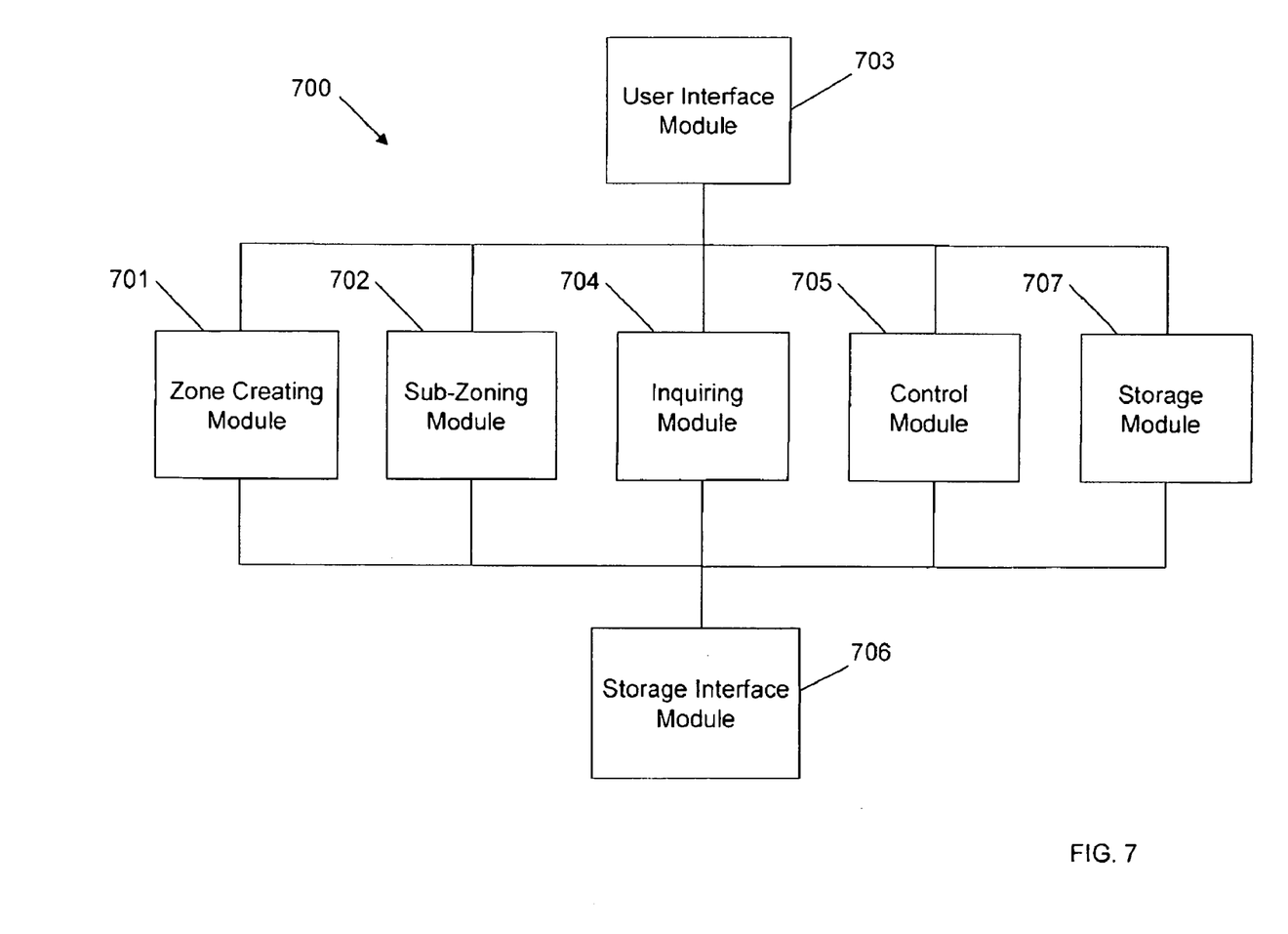
FIG. 7 is a schematic representation of a sub-zoning system in accordance with the invention.

With reference to FIG. 7, a system 700 in which the sub-zoning approach is implemented is shown. The system 700 includes a zone creating module 701, sub-zoning module 702, an interlink module 708, a user interface module 703, an inquiring module 704, a control module 705, and a logical interface module 706. Module 701, 702 and 708 are used in sub-zoning and accessibility processing, that is, the creation of sub-zones, adding and deleting of user and logical unit ID, etc. Modules 703, 706, 704 and 705 implement the access to the storage and the inquire/response to the logical units.

Zone creating module 701 creates multiple sub-zones.

Sub-zoning module 702 allocates multiple users to each pre-designated sub-zone, as well as the multiple logical units in such way that there is at least one sub-zone that is allocated to at least two logical units, the logical units residing in the storage hardware.

Interlink module 708 implements (creates and abolishes) the accessibility interlinks between the users and logical units within the same sub-zones, that is, adding or deleting the user and logical unit IDs, setting up the accessibility authorization, etc.

User interface module 703 interacts with the user hardware devices and receives the access requests from the users;

Logical interface module 706 interacts with the logical interfaces of the storage hardware devices.

Inquiring module 704 inquires the user ID on access request and further inquires the logical units ID from the sub-zones that carry the user ID.

Control module 705 determines and validates the accessibility of the users to the storage when the logical units ID is found. If the accessibility is validated, it instructs the Logical interface module 706 to pass the access request to the storage hardware, otherwise, it instructs the User interface module 703 to feedback "access denying" signal to the users.

The sub-zoning system 700 may also include Storage module 707 which records the user and logical units ID, and accessibility and the application classification of the sub-zones. Storage module 707 may record the above information by the bitmap format.

The sub-zoning system 700 takes variety of forms: It can be a sub-zone itself; it can be formed by the sub-zone administration layer (modules 701, 702, 703, 704, 705 and 706) and a sub-zone (module 707); and it can also be formed by the administration layer (modules 701, 702, 703 and 704) and the sub-zone (modules 707, 705 and 706).

Figure 8:
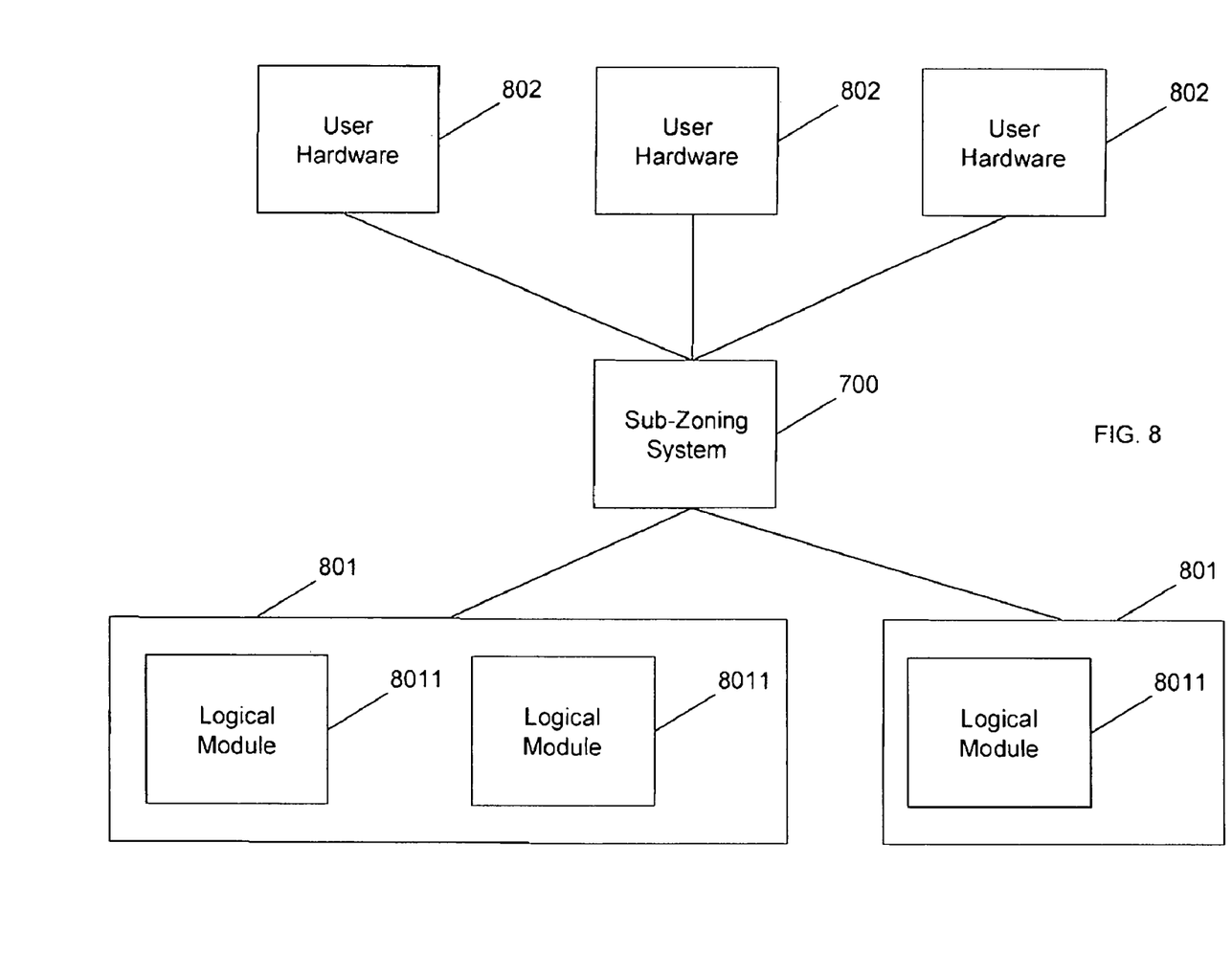
FIG. 8 is a schematic representation of a storage system in accordance with the invention.

With reference to FIG. 8, a storage system is implemented based on the sub-zoning approach and includes storage hardware 801, user hardware 802 and the sub-zoning system 700. Storage hardware 801, including the logical units 8011, is used to process access requests and maintain/keep the data. User hardware 802 is operable to initiate and inquire the access request as well as to receive feedback. The sub-zoning system or scheme 700 operates as the administrative body for the sub-zoning and access requests. Upon request to access from a user hardware device, it inquires the user ID among the sub-zones and then the correspondent logical units ID from the sub-zones if the user ID is found in them. It then passes the access request to the Logical unit 8011 inside the Storage hardware 801 if the logical unit ID is found and validated, otherwise, denies that request to access.

The methods of the invention may be implemented in software and can be stored into floppy, hard disk, CD/DVD and flash, etc storage media.

The methods and system of the invention allocate multiple user hardware devices and logical units to the correspondent sub-zones and establish certain accessibility interlinks between the users and logical units while prohibiting the interlinks/accessibility across different sub-zones. This simplifies the interlinks between the logical units and users significantly, from the prior art large scale one-to-one involved relationships to much smaller scale sub-zoned or sub-grouped ones. Therefore, the process of manipulating and handling the complex interlinks between the users and logical units becomes a lot easier and quicker, and more importantly, much less error prone. The policies of sub-zoning, specifically the sub-zoning according to the application classification approach, have many advantages such as data and resource sharing and de-duplication. The methods and system of the invention also presents an approach to access to the logical units inside the storage hardware in the event of sub-zoning, such that the inquiring to logical units is made within the sub-zones that carry the user ID, not all logical units. The inquiring effort and data amount are thus much less than those of prior art schemes. The access control is also much easier since the users don't have accessibility to those logical units that are outside the same sub-zones.

Other developers in the same industry sector can do many alternations and modifications to the disclosed methods and system as long as the basic principles and concepts are observed. Therefore, the inventor claims and reserves the right to any alteration and modification to the described methods and system.

What is claimed is:

1. A method for controlling user access to data stored in a storage data pool, said method comprising:

associating a plurality of user hardware devices to a plurality of sub-zones;

associating a plurality of logical storage units of said storage data pool to said plurality of sub-zones; and establishing data access interlinks between said plurality of user hardware devices and said plurality of logical storage units, wherein, for each user hardware device, at least one data access interlink is established between the user hardware device and at least one logical storage unit associated to a same sub-zone as the user hardware device.

2. The method of claim 1, wherein, there is at least one sub-zone that is associated with at least two logical storage units.

3. The method of claim 1 wherein said plurality of user hardware devices are associated to said plurality of sub-zones according to properties of applications they are responsible for, wherein, each group of at least one user hardware device that is responsible for the applications of the same properties is associated to the same sub-zone.

4. The method of claim 1 wherein said plurality of logical storage units are associated to said plurality of sub-zones according to properties of applications they are responsible for, wherein, each group of at least one logical storage unit that is responsible for the applications of the same properties is associated to the same sub-zone.

5. The method of claim 1 wherein each sub-zone is associated with a same number of logical storage units as the remaining sub-zones.

6. The method of. claim 1 wherein each sub-zone is associated with a random number of logical storage units.

7. The method of claim 1, further comprising dynamically changing association amongst said plurality of user hardware devices, said plurality of logical storage units and said plurality of sub-zones.

8. The method of claim 7, further comprising upon one said plurality of logical storage units, associated with one of said plurality of sub-zones, being made inaccessible to all of the user hardware devices associated with said one of said plurality of sub-zones, dissociating said one of said plurality of logic storage units from said one of said plurality of sub-zones.

9. The method of claim 1 wherein each sub-zone is associated with a same number of user hardware devices as the remaining sub-zones.

10. The method of claim 1 wherein each sub-zone is associated with a random number of user hardware devices.

11. The method of claim 1 wherein in any one of said plurality of sub-zones, identifiers of the user hardware devices and logical storage units that are associated to the sub-zone are saved in the sub-zone; said method further comprises:
receiving, from a user hardware device, a request for access to one of said plurality of logical storage units;
determining whether an identifier of the user hardware device initiating said request is saved in any of said plurality of sub-zones;
in response to determining that the identifier of the user hardware device initiating said request is saved in at least one of said plurality of sub-zones, ascertaining whether an identifier of a logical storage unit carried in said request is saved in any of said at least one sub-zone that saves the identifier of the user hardware device initiating said request; and
in response to ascertaining that the identifier of the logical storage unit carried in said request is saved in at leas one of said at least one sub-zone that saves the identifier of the user hardware device initiating said request, accepting said request.

12. The method of claim 11, further comprising:
in response to ascertaining that the identifier of the logical storage unit carried in said request is saved in at least one of said at least one sub-zone that saves the identifier of the user hardware device initiating said request, identifying whether the user hardware device initiating said request has a right to access the logical storage unit identified by the identifier of the logical storage unit carried in said request by determining whether said request satisfies an access right saved in a sub-zone that saves the identifier of the logical storage unit carried in said request and the identifier of the user hardware device initiating said request; and
in response to identifying that the user hardware device initiating said request has the right, accepting said request.

13. The method of claim 12, further comprising:
in response to identifying that the user hardware device initiating said request has no right, transmitting a denial of access to said user hardware device initiating said request.

14. The method of claim 11, further comprising: transmitting a denial of access to said user hardware device initiating said request upon determining that the identifier of the user hardware device initiating said request is not saved in any of said plurality of sub-zones, or the identifier of the logical storage unit carried in said request is not saved in any of said at least one sub-zone that saves the identifier of the user hardware device initiating said request.

15. The method of claim 11, before receiving said request, further comprising:
providing, to said user hardware device initiating said request, identifiers of all logical storage units associated to at least one of said plurality of sub-zones which is associated with said user hardware device initiating said request, so that said user hardware device initiating said request selects the identifier of the logical storage unit to be carried in said request from said identifiers of all logical storage units provided.

16. A system for controlling access to data stored in a storage data pool by a plurality of user hardware devices, said system comprising:
a zone creating module, for creating a plurality of sub-zones;
a sub-zoning module, for associating a plurality of user hardware devices to a plurality of sub-zones, associating a plurality of logical storage units of said storage data pool to said plurality of sub-zones; and
an interlink module, for establishing data access interlinks between said plurality of user hardware devices and of said plurality of logical storage units, wherein, for each user hardware device, at least one data access interlink is established between the user hardware device and at least one logical storage unit associated to a same sub-zone as the user hardware device.

17. The system of claim 16, wherein in any one of said plurality of sub-zones, identifiers of the user hardware devices and logical storage units that are associated to the sub-zone are saved in the sub-zone; said system further comprises:
a user interface module, for receiving, from a user hardware device, a request for access to one of said plurality of logical storage units;
an inquiring module, for inquiring an identifier of the user hardware device initiating said request in said plurality of sub-zones, when the identifier of the user hardware device initiating said request is found in at least one of said plurality of sub-zones, inquiring an identifier of a logical storage unit carried in said request in said at least one sub-zone that saves the identifier of the user hardware device initiating said request; and
a control module, for accepting said request when the identifier of the logical storage unit carried in said request is found in said at least one sub-zone that saves the identifier of the user hardware device initiating said request.

18. A storage system comprising:
a storage hardware in which a plurality of logical storage units reside and operable to handle a request for access to one of said plurality of logical storage units;
a user hardware device operable to initiate said request; and
a sub-zoning system for receiving said request from said user hardware device, inquiring an identifier of the user hardware device initiating said request in said plurality of sub-zones, when the identifier of the user hardware device initiating said request is found in at least one of said plurality of sub-zones, inquiring an identifier of a logical storage unit carried in said request in said at least one sub-zone that saves the identifier of the user hardware device initiating said request, and when the identifier of the logical storage unit carried in said request is found in said at least one sub-zone that saves the identifier of the user hardware device initiating said request, accepting said request and forwarding said request to said storage hardware for its handling.

* * * * *